United States Patent Office 3,706,744
Patented Dec. 19, 1972

3,706,744
HYDRAZONE DERIVATIVES OF 3-SUBSTITUTED AMINO-6-HYDRAZINO PYRIDAZINES
Paul L. Anderson, Dover, and William J. Houlihan and Robert E. Manning, Mountain Lakes, N.J., assignors to Sandoz-Wander, Inc., Hanover, N.J.
No Drawing. Filed Nov. 16, 1970, Ser. No. 90,002
Int. Cl. C07d 51/04
U.S. Cl. 260—250 A         6 Claims

ABSTRACT OF THE DISCLOSURE

Hydrazone derivatives of 3-substituted amino-6-hydrazino pyridazines, e.g., 3 - diallylamino - 6-[2-(hept-4-ylidene)hydrazino]-pyridazine are prepared from 3-substituted amino-6-hydrazino pyridazines and carbonyl compounds and exhibit anti-hypertensive activity.

---

This invention concerns novel pyridazine compounds. More particularly it concerns hydrazone derivatives of 3-substituted amino-6-hydrazino pyridazines, methods for their preparation and their use as hypotensive/anti-hypertensive agents.

The compounds of this invention may be represented by the formula

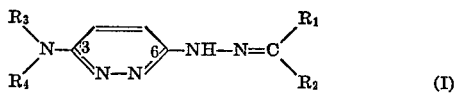

(I)

where $R_1$ and $R_2$ each independently represents hydrogen; lower alkyl, i.e., lower alkyl having 1 to 5 carbon atoms, e.g. methyl, ethyl, isopropyl or the like or alkenyl having 3 to 5 carbon atoms such as allyl, 1-butenyl or the like and $R_3$ and $R_4$ each represent hydrogen or alpenyl having 3–5 carbon atoms provided at least one of $R_3$ and $R_4$ represents said alkenyl, and pharmaceutically acceptable acid addition salts thereof.

The process for preparing the compounds of Formula I may be represented by the following reaction scheme:

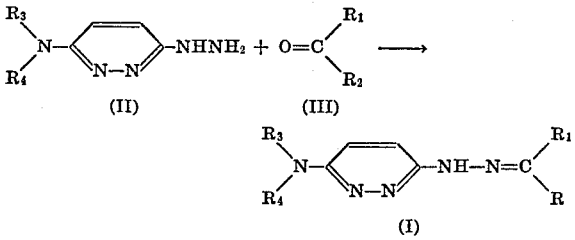

where $R_1$, $R_2$, $R_3$, $R_4$ and the proviso are as defined above.

Compounds I are prepared by treating 3-substituted amino-6-hydrazino pyridazines of Formula II with the carbonyl compounds of the Formula III. Normally, the reaction is carried out at a temperature of about 0° to 50° C., preferably 10° to 30° C., especially 20° to 25° C. for about 1 to 4 hours. An inert solvent may be used such as lower alkanol, especially methanol or ethanol, or aromatic or saturated aliphatic hydrocarbons, especially benzene, toluene, and the like. When feasible, excess reactant (III) may be used as solvent. Neither the temperatures nor the presence of solvent are critical in obtaining the product (I). The pyridazines of Formula I may be recovered using conventional techniques, e.g. crystallization.

The compounds of Formula II are prepared in accordance with the following reaction scheme:

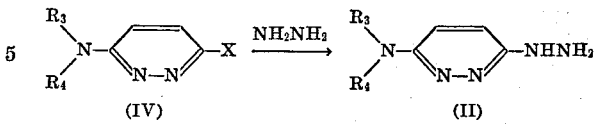

where $R_3$, $R_4$ and the provisos are as defined above and X is halo having an atomic weight between about 35 to 80.

The compounds of Formula II are prepared by treating a compound of Formula IV with hydrazine. Although the temperature is not critical, the reaction is suitably carried out at a temperature of about 20° to 115° C., preferably between about 60° to 115° C., and especially between about 80° to 115° C. The use of solvent is not necessary, although excess hydrazine or inert solvents such as lower alkanol, especially methanol or ethanol may be used if desired. The product is recovered by conventional techniques, e.g., extraction and recrystallization.

The compounds of Formula IV may be prepared according to the following scheme:

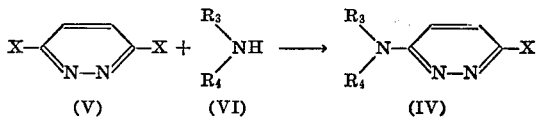

where $R_3$, $R_4$, X and the provisos are as defined above.

The compounds of Formula IV are prepared by treating a pyridazine of Formula V with an amine of Formula VI. Although the temperature is not critical, the reaction is normally carried out at a temperature between about 0° to 100° C., preferably between about 20° to 80° C., more preferably 60° to 80° C. Although not necessary, inert solvent may be used, preferably lower alkanols, especially methanol, ethanol and isopropanol. When feasible, excess reactant (II) may also be used as solvent. The compounds (II) are recovered using conventional techniques, e.g., evaporation or crystallization.

The compounds of Formula II and IV are obtained in base form by adding excess hydrazine or amine or a base, e.g., sodium hydroxide, in the above processes. When the compounds of Formula II and IV are obtained as acid addition salts and it is desired to convert them to the free base, this may be accomplished using conventional methods, e.g., by dissolving the salt in water and adding sodium carbonate. Conversely, the compounds of Formula I can be converted to salt form by conventional techniques, e.g., by dissolving the salt in lower alkanol and treating with a suitable acid.

The compounds of Formula V and many of the compounds of Formula III and VI are known and can be prepared by techniques disclosed in the literature. The compounds of Formula III and VI not specifically disclosed in the literature can be prepared by known techniques using known starting materials.

The compounds represented by Formula I are useful because they possess pharmaceutical properties in animals. In particular, these compounds are useful as hypotensives/anti-hypertensives as indicated in renal hypertensive rats given 100 mg./kg. of active compound using the technique of A. Grollman (Proc. Soc. Exp. Biol. and Med. 57: 102, 1944) and indirectly measuring the blood pressure from the caudal artery in the tail using a pneumatic pulse transducer.

When so utilized the compounds may be combined with one or more pharmaceutically acceptable carriers or adjuvants. They may be administered orally or parenterally and, depending upon the compound employed and the mode of administration, the exact dosage utilized may vary. Furthermore, the compounds (I) may be similarly administered in the form of their nontoxic pharmaceutically acceptable acid addition salts. Such salts possess the same order of activity as the free base and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzenesulfonate and the like.

When the compounds are administered as hypotensive/anti-hypertensive agents, satisfactory results are obtained at daily dosages of about 1.0 milligram to about 200 milligrams per kilogram of animal body weight. This daily dosage is preferably administered 2 to 4 times a day or in sustained release form. For most large animals such as primates, the total daily dosage is from about 50 milligrams to about 1000 milligrams. Dosage forms suitable for internal use comprise from about 12.5 to about 500 milligrams of the active compound in intimate admixture with a solid or liquid pharmaceutically acceptable carrier or diluent.

A representative formulation suitable for oral administration is a capsule prepared by standard encapsulating techniques which contains the following:

Ingredient: Weight, mg.
3-diallylamino-6-[2-(hept-4-ylidene)hydrazino]-
 pyridazine _____ 100
Inert filler (starch, kaolin, lactose, etc.) _____ 200

EXAMPLE 1

3-diallylamino-6-[2-hept-4-ylidene)hydrazino]-
pyridazine

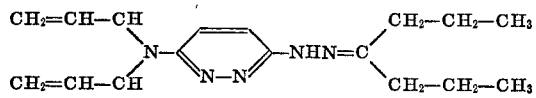

Step A: 6-chloro-3-diallylaminopyridazine.—To an ice bath cooled solution of 29.7 g. of 3,6-dichloro-pyridazine in 250 ml. of ethanol is added slowly with stirring 38.8 g. of diallylamine. The reaction mixture is refluxed 118 hours and the solvent removed at reduced pressure. To the residue is added 300 ml. of water and 35 ml. of a 50% aqueous sodium hydroxide solution. The mixture is extracted with ether, the ether extracts are dried and the solvent is removed. Crystallization from ether-pentane (1:1) provides 6-chloro-3-diallylamino-pyridazine.

Step B: 3-diallylamino-6-hydrazino-pyridazine.—To 20.0 g. of 6-chloro-3-diallylamino-pyridazine is added slowly with stirring 214 ml. of a 97% hydrazine solution. After the pyridazine derivative dissolves, the mixture is refluxed for 16 hours, cooled, and 250 ml. of water is added. The mixture is extracted with chloroform, and the chloroform extracts are then dried and the solvent evaporated. The product is obtained as an oil.

Step C: 3-diallylamino-6-[2-(hept-4-ylidene)hydrazino]-pyridazine.—To an ice bath cooled solution of 10.0 g. of 3-diallylamino-6-hydrazino-pyridazine in 100 ml. of methanol is added slowly 75 g. of 4-heptanone. The mixture is allowed to warm to room temperature and stirred for about 2 hours. The solvent is evaporated at reduced pressure and the residue chilled to induce crystallization of 3-diallylamino-6-[2-(hept-4-ylidene)-hydrazino]pyridazine.

When the above procedure is carried out and an equivalent amount of formaldehyde or 1-pentene-4-one, is used in place of 4-heptanone, there is obtained 3-diallylamino-6-(2-methylidenehydrazino)-pyridazine or 3-diallylamino-6-[2-(1-penten-4-ylidene)-hydrazino]-pyridazine, respectively.

EXAMPLE II 3-allylamino-6-[2-(hept-4-ylidene)hydrazino]
pyridazine

Following the procedures of Steps A, B, and C of Example 1 but using an equivalent amount of allylamino in place of the diallylamino used therein, there is obtained 3-allylamino-6-[2-(hept-4-ylidene)hydrazino]pyridazine.

What is claimed is:
1. A compound of the formula

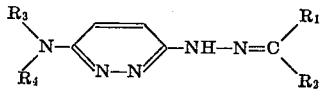

where
$R_1$ and $R_2$, independently, represent hydrogen, lower alkyl or alkenyl having 3 to 5 carbon atoms and
where
$R_3$ and $R_4$ each represent hydrogen or alkenyl having 3–5 carbon atoms, provided at least one of $R_3$ and $R_4$ represents said alkenyl,
or a pharmaceutically acceptable acid addition salt thereof.

2. The compound of claim 1 which is 3-diallylamino-6-[2-(hept-4-ylidene)hydrazino]pyridazine.

3. The compound of claim 1 which is 3-diallylamino-6-(2-methylidenehydrazino)pyridazine.

4. The compound of claim 1 which is 3-diallylamino-6-[2-(1-penten-4-ylidene)hydrazino]pyridazine.

5. The compound of claim 1 which is 3-allylamino-6-[2-(hept-4-ylidene)hydrazino]pyridazine.

6. A process for preparing a compound of claim 1 in free base form which comprises treating a compound of the formula

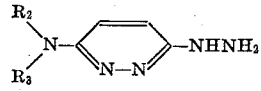

with a compound of the formula

where $R_1$, $R_2$, $R_3$, $R_4$ and the provisos are as set out in claim 1.

References Cited
UNITED STATES PATENTS 3,598,822   8/1971   Anderson et al. _____ 260—250 A NICHOLAS S. RIZZO, Primary Examiner U.S. Cl. X.R.

424—250